US012468659B2

(12) United States Patent
Stephens et al.

(10) Patent No.: US 12,468,659 B2
(45) Date of Patent: *Nov. 11, 2025

(54) ACTIVITY BASED SORTING IN COLLABORATIVE APPLICATIONS

(71) Applicant: Microsoft Technology Licensing, LLC, Redmond, WA (US)

(72) Inventors: David Adam Stephens, Seattle, WA (US); Shane Michael Chism, Bellevue, WA (US); Nathan Darrel Kile, Jr., Mercer Island, WA (US); Angela Kaye Allison, Redmond, WA (US); Dan Zarzar, Redmond, WA (US); Douglas Lane Milvaney, Somerville, MA (US); Manoj Sharma, Winchester, MA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/538,653

(22) Filed: Dec. 13, 2023

(65) Prior Publication Data

US 2024/0126721 A1    Apr. 18, 2024

Related U.S. Application Data

(63) Continuation of application No. 17/706,133, filed on Mar. 28, 2022, now Pat. No. 11,880,339.

(60) Provisional application No. 63/274,078, filed on Nov. 1, 2021.

(51) Int. Cl.
| | | |
|---|---|---|
| *G06F 3/048* | (2013.01) | |
| *G06F 3/0482* | (2013.01) | |
| *G06F 3/04847* | (2022.01) | |
| *G06F 16/16* | (2019.01) | |
| *G06F 16/176* | (2019.01) | |

(52) U.S. Cl.
CPC .......... *G06F 16/168* (2019.01); *G06F 3/0482* (2013.01); *G06F 3/04847* (2013.01); *G06F 16/176* (2019.01)

(58) Field of Classification Search
CPC .. G06F 16/168; G06F 3/0482; G06F 3/04847; G06F 16/176; G06Q 10/101
See application file for complete search history.

(56) References Cited

U.S. PATENT DOCUMENTS

| | | | |
|---|---|---|---|
| 2017/0052955 A1* | 2/2017 | Nandy | G06F 16/9535 |
| 2017/0177182 A1* | 6/2017 | Wong | H04L 67/535 |
| 2017/0318020 A1* | 11/2017 | Kamath | G06F 16/13 |
| 2019/0251197 A1* | 8/2019 | Li | G06F 16/156 |
| 2022/0269703 A1* | 8/2022 | Gentilcore | G06F 16/24578 |

* cited by examiner

*Primary Examiner* — Thanh T Vu

(57) ABSTRACT

Aspects of the present disclosure relate to systems and methods for sorting one or more files hosted by a collaborative application. In one aspect, one or more activity signals associated with one or more files hosted by the collaborative application may be received from a substrate. An activity-based sort order may be determined using at least a combination of the one or more activity signals. The activity-based sort order may be applied to sort the one or more files hosted by the collaborative application for display in a user interface to an activity object of the collaborative application.

20 Claims, 9 Drawing Sheets

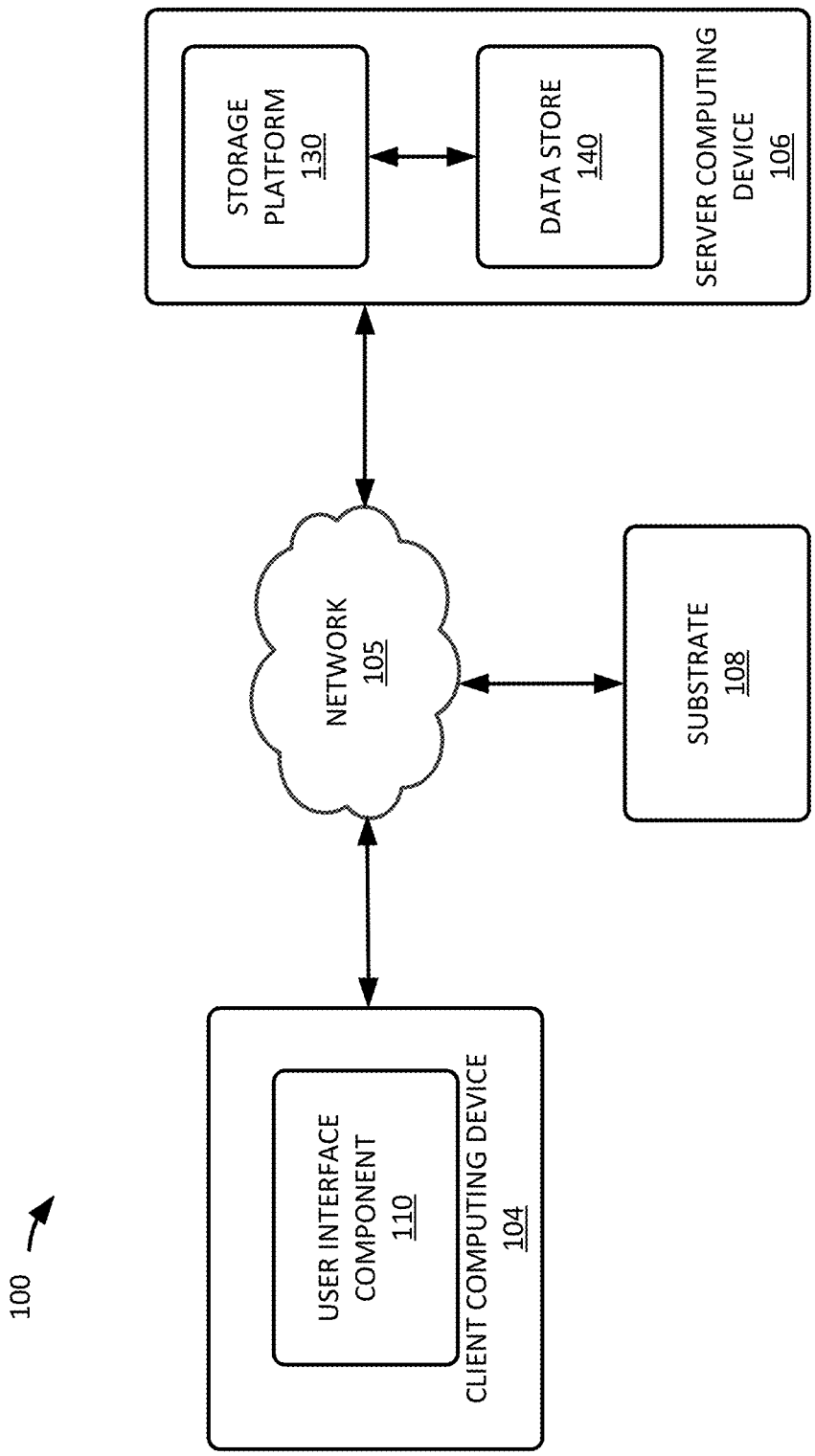

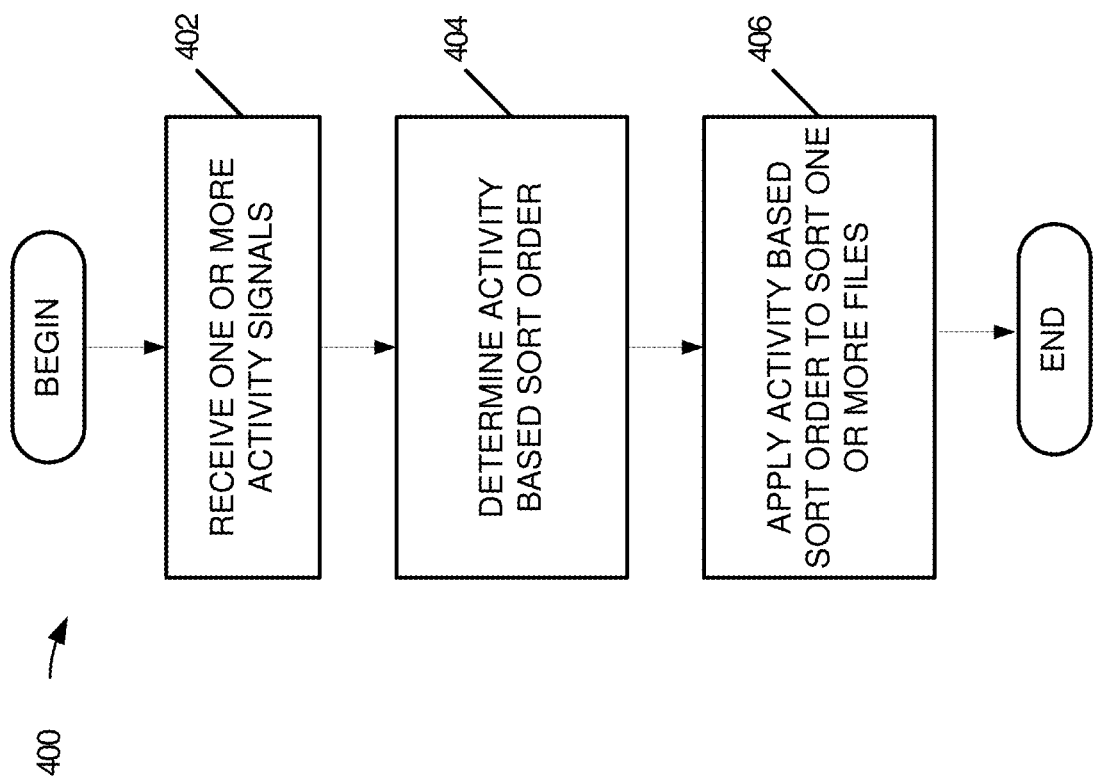

ACTIVITY BASED SORTING IN COLLABORATIVE APPLICATIONS

RELATED APPLICATIONS

This application is related to—and claims the benefit of priority to— U.S. Patent Application No. 63/274,078, filed on Nov. 1, 2021, and entitled ACTIVITY BASED SORTING IN COLLABORATIVE APPLICATION, and to U.S. patent application Ser. No. 17/706,133, filed on Mar. 28, 2022, and entitled ACTIVITY BASED SORTING IN COLLABORATIVE APPLICATIONS, which are hereby incorporated by reference in its entirety.

TECHNICAL FIELD

Aspects of the disclosure are related to the field of computer software applications and, in particular, to technology solutions for collaborative computing environments.

BACKGROUND

Computer and software users have grown accustomed to user-friendly software applications for co-authoring files, documents, messages, and the like. For example, storage providers (e.g., cloud storage providers) provide applications where users can co-author and collaborate with one another within the applications. As more users share, co-author, and collaborate on documents created with these applications, it becomes increasingly difficult for users to stay apprised of changes to the documents, whether users are in or away from the applications. Current techniques for solving this problem include surfacing changes to a document while a user has a document open and is in the document. Additionally, users may sort documents to find recent changes. However, current techniques for sorting documents only allow for sorting in one way at any given time. As a result, interacting with and collaborating in a document may be cumbersome, difficult, and inefficient, ultimately resulting in a lack of participating in document interaction and/or collaboration. In turn, current techniques for apprising users of content changes are inefficient and inadequate.

Overview

This Overview is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In summary, the disclosure generally relates to systems and methods for sorting one or more files hosted by a collaborative application. In one aspect, one or more activity signals associated with one or more files hosted by the collaborative application may be received from a substrate. An activity-based sort order may be determined using at least a combination of the one or more activity signals. The activity-based sort order may be applied to sort the one or more files hosted by the collaborative application for display in a user interface to an activity object of the collaborative application.

In another aspect, a sort criteria may be determined for activities associated with one or more files hosted by the collaborative application. The activities associated with the one or more files hosted by the collaborative application that meet the sort criteria may be retrieved from a substrate. The activities may include associated activity information. The one or more files hosted by the collaborative application may be sorted based on the sort criteria for display in a user interface to an activity object of the collaborative application, where each of the one or more sorted files highlights its associated activities.

In yet another aspect, activities input by one or more users of a plurality of files hosted by a collaborative application may be published to a substrate. One or more activity signals including at least some of the activities may be received from the substrate. The plurality of files hosted by the collaborative application may be sorted using an activity-based sort order for display in a user interface to an activity object of the collaborative application. One or more updated activity signals including updated activities may be received. The activity-based sort order may be adjusted based on the one or more updated activity signals. The plurality of files hosted by the collaborative application may be re-sorted using the adjusted activity-based sort order for display in the user interface to the activity object of the collaborative application.

DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

FIG. 1 illustrates an exemplary activity-based sorting system for sorting one or more files hosted by a collaborative application, according to an example aspect.

FIG. 4 illustrates an exemplary method for sorting one or more files hosted by a collaborative application, according to an example aspect.

DETAILED DESCRIPTION

Figure 2A:
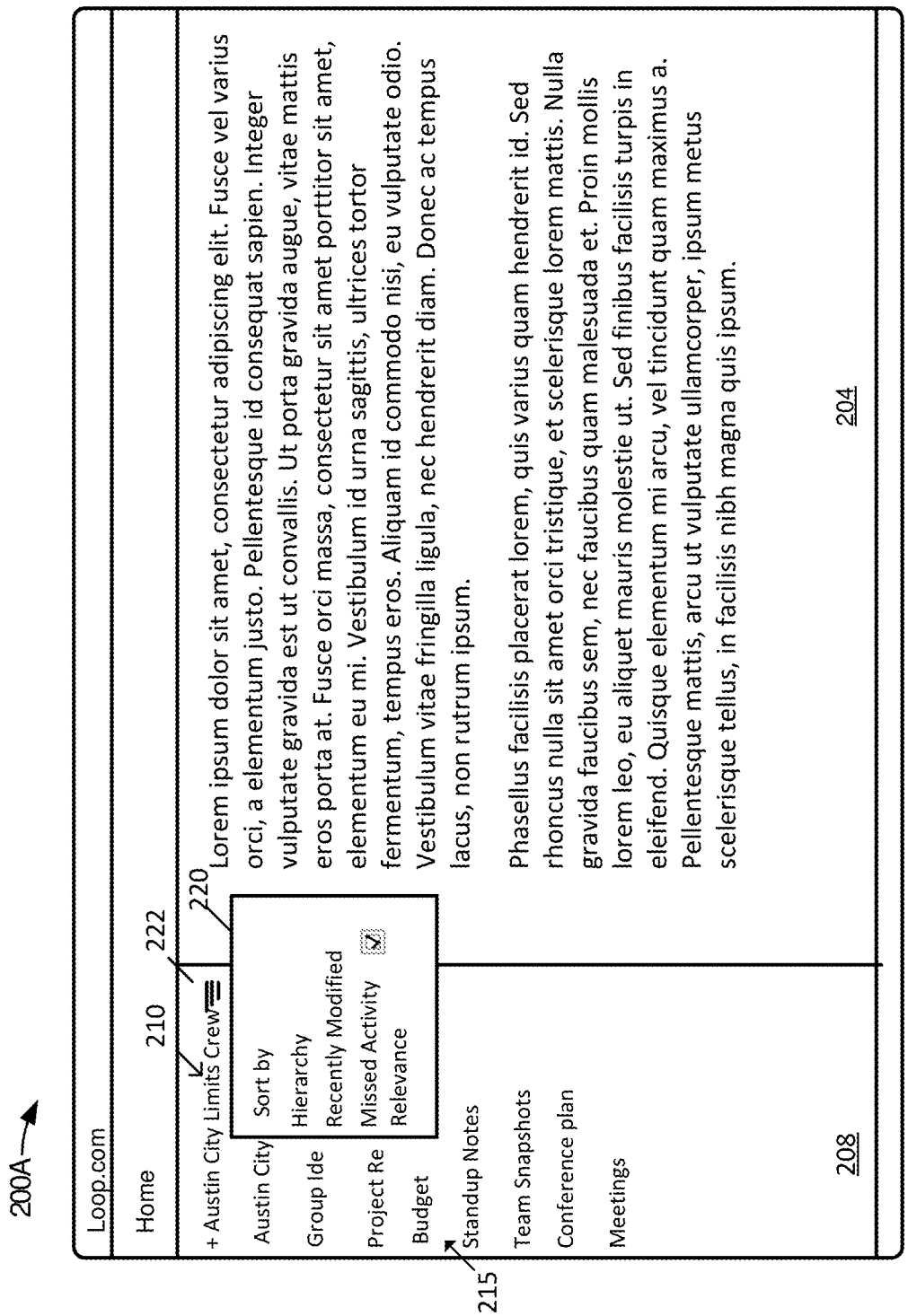
FIG. 2A illustrates one view in a progression of views of a collaborative application displayed on a user interface of a client computing device, according to an example aspect.

Aspects of the disclosure are generally directed to sorting one or more files hosted by a collaborative application. For example, a collaborative application facilitates collaboration between team members working on a project together, for example. The team members can see each other's activity associated with one or more files in real-time. In one example, the set of files to which the team members have shared access is a workspace. As such, each user (e.g., team member) of the set of files may have their own workspace environment associated with the collaborative application and the one or more shared files. A user interface to the collaborative application may facilitate navigation between these one or more shared files in each users workspace. For example, an activity object of the collaborative application may be used to surface navigation tools for navigating, sorting, viewing, and interacting with the one or more shared files and the one or more shared files associated activities. In this regard, users/team members of the collaborative application may choose how they want to navigate, view and/or sort shared files in their workspace environment.

As discussed above, computer and software users have grown accustomed to user-friendly software applications for co-authoring files, documents, messages, and the like. For example, storage providers (e.g., cloud storage providers) provide applications where users can co-author and collaborate with one another within the applications. As more users share, co-author, and collaborate on documents created with these applications, it becomes increasingly difficult for users to stay apprised of changes to the documents, whether users are in or away from the applications. Current techniques for solving this problem include surfacing changes to a document while a user has a document open and is in the document. Additionally, users may sort documents to find recent changes. However, current techniques for sorting documents only allow for sorting in one way at any given time. As a result, interacting with and collaborating in a document may be cumbersome, difficult, and inefficient, ultimately resulting in a lack of participating in document interaction and/or collaboration. In turn, current techniques for apprising users of content changes are inefficient and inadequate.

Accordingly, aspects described herein include publishing activities input by one or more users of a plurality of files hosted by a collaborative application to a substrate. As users of the plurality of files (e.g., shared files) apply/input activities to the shared files, the activities are published to the substrate. The substrate may include any service and/or data store for storing activities and information associated with activities. The substrate may further include any logic for processing and/or analyzing the activities and associated activity information. In one example, the substrate is located separate from (e.g., outside) the collaborative application. One or more activity signals including at least some of the activities may be received from the substrate. For example, the one or more activity signals may be received at the collaborative application. In another example, the one or more activity signals may be received at the activity object. The substrate may be polled by at least one of the collaborative application and the activity object for one or more activity signals. In another example, the activity signals may push to at least one of the collaborative application and the activity object as new activities are published to the substrate.

The plurality of files hosted by the collaborative application may be sorted using an activity-based sort order. For example, in response to one or more activity signals being received, an activity-based sort order may be determined using a combination of the one or more activity signals. The plurality of sorted files may be displayed in a user interface to the activity object of the collaborative application. Each of the plurality of files may highlight its associated activities for viewing by a user of the collaborative application. In this regard, a user may view activities associated with the plurality of files without opening any of the plurality of files. The activity-based sort order may prioritize the plurality of files from top to bottom based on relevancy for a user of the collaborative application. For example, the files located near the top of the sorted files may have associated activities that are determined to be more relevant to the user such that the user may quickly view those activities and files without having to open the files and look for activities. As such, a technical effect that may be appreciated is that shared files are sorted for each user of the shared files in a clear and understandable manner and on a functional surface so that a user may quickly and efficiently understand, identify, interact with, navigate, collaborate and receive feedback regarding content/activities of the shared file. Another technical effect that may be appreciated is that users and/or team members of a file may quickly, easily, and efficiently sort, view, navigate and interact with activity objects, shared files, and activities/content while collaborating within applications.

Further aspects described herein include receiving one or more updated activity signals including updated activities. The one or more updated activity signals may be received from the substrate. In one example, the one or more updated activity signals may be received at the collaborative application. In another example, the one or more updated activity signals may be received at the activity object. The substrate may be polled by at least one of the collaborative application and the activity object for one or more updated activity signals. In another example, the updated activity signals may push to at least one of the collaborative application and the activity object as new and/or updated activities are published to the substrate. In response to receiving one or more updated activity signals, the activity-based sort order may be adjusted based on the one or more updated activity signals. The plurality of files hosted by the collaborative application may be re-sorted using the adjusted activity-based sort order. The plurality of re-sorted files may be displayed in the user interface to the activity object of the collaborative application. In some examples, a user may view the plurality of files moving up and down in the user interface to the activity object as the plurality of files are being re-sorted. In other examples, when the plurality of files is re-sorted each of the plurality of files is updated to reflect its associated updated activities for viewing by the user of the collaborative application. Yet another technical effect that may be appreciated is that the continual re-sorting and/or ordering of shared files for each user of the collaborative application facilitates efficiently updating and apprising a user of content/activities associated with the shared files across all instances of the collaborative application and unique workspace environments in multiple locations, across multiple files in real-time and therefore avoids incurring network roundtrip costs and does not affect the data server storage.

Referring now to the drawings, in which like numerals represent like elements through the several figures, aspects of the present disclosure and the exemplary operating environment will be described. With reference to FIG. 1, one aspect of an activity based sorting system 100 for sorting one or more files hosted by a collaborative application is illustrated. The activity based sorting system 100 may include a client computing device 104, a server computing device 106, and a substrate 108. In aspects, the activity based sorting system 100 may be implemented on the client computing device 104. In a basic configuration, the client computing device 104 is a handheld computer having both input elements and output elements. The client computing device 104 may be any suitable computing device for implementing the activity based sorting system 100 for sorting one or more files hosted by a collaborative application. For example, the client computing device 104 may be at least one of: a mobile telephone; a smart phone; a tablet; a phablet; a smart watch; a wearable computer; a personal computer; a desktop computer; a laptop computer; a gaming device/computer (e.g., Xbox); a television; etc. This list is exemplary only and should not be considered as limiting. Any suitable client computing device 104 for implementing the activity based sorting system 100 for sorting one or more files hosted by a collaborative application may be utilized.

In aspects, the activity based sorting system 100 may be implemented on the server computing device 106. The server computing device 106 may provide data to and from the client computing device 104 through a network 105. In aspects, the activity based sorting system 100 may be implemented on more than one server computing device 106, such as a plurality of server computing devices 106. As discussed above, the server computing device 106 may provide data to and from the client computing device 104 through the network 105. The data may be communicated over any network suitable to transmit data. In some aspects, the network is a distributed computer network such as the Internet. In this regard, the network may include a Local Area Network (LAN), a Wide Area Network (WAN), the Internet, wireless and wired transmission mediums.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, the aspects and functionalities described herein may operate over distributed systems (e.g., cloud-based computing systems), where application functionality, memory, data storage and retrieval, and various processing functions may be operated remotely from each other over a distributed computing network, such as the Internet or an Intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which aspects of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

As discussed above, the activity based sorting system 100 may include the client computing device 104, the server computing device 106, and the substrate 108. The various components may be implemented using hardware, software, or a combination of hardware and software. In aspects, the client computing device 104 may include a user interface component 110. The user interface component 110 may be configured to sort one or more files hosted by a collaborative application. In one example, a collaborative application may include any application suitable for collaboration, co-authoring, and/or sharing between team members such as Office applications, email applications, chat applications, voice application, OneNote, Planner, Project, Power BI, Visual Studio, Loop.com, and the like. In one case, the one or more files hosted by the collaborative application may include Office files such as a word document, a spreadsheet, an electronic slide presentation, an email, a chat conversation, OneNote pages, workspaces, graphs, and the like.

The user interface component 110 may be configured to display the one or more files in an activity object of the collaborative application. In one example, the activity object may include at least one of a navigation tool, a graph tool, and a workspace tool. The navigation tool may include a surface that facilitates navigating, sorting, filtering, and viewing a list of files. In one example, the navigation tool includes a side bar of the collaborative application. The side bar may include a left navigation menu. In some examples, the list of sorted files and/or the navigation tool exist within a workspace environment unique to the user of the collaborative application. One or more workspace environments may be surfaced in the user interface to the activity object and/or navigation tool. As such, when the activity object includes the navigation tool, the user interface component 110 may be configured to display and/or surface the one or more files as a list of files for viewing by a user of the collaborative application.

The graph tool may include a surface that facilitates navigating, sorting, filtering, and viewing files. For example, the graph tool may include one or more graphs of the collaborative application. The one or more files may be sorted in the form of graphs. For example, the one or more graphs may illustrate activity information associated with each file of the one or more files hosted by the collaborative application. The one or more graphs may be surfaced as a list of thumbnails where each thumbnail represents a graph. As such, when the activity object includes the graph tool, the user interface component 110 may be configured to display and/or surface the one or more files as graphs for viewing by a user of the collaborative application. The workspace tool may include a surface that facilitates navigating, sorting, filtering, and viewing workspaces. For example, the workspace tool may include a list of workspaces and/or one or more thumbnails of workspaces. In some examples, each of the thumbnails of sorted workspaces may be unique to the user of the collaborative application. One or more workspaces may be surfaced in the user interface to the activity object and/or workspace tool. As such, when the activity object includes the workspace tool, the user interface component 110 may be configured to display and/or surface the one or more files as workspaces for viewing by a user of the collaborative application.

As discussed above, the user interface component 110 may be configured to sort and display one or more files hosted by the collaborative application. In aspects, the client computing device 104 and/or the user interface component 110 may be configured to sort the one or more files hosted by the collaborative application based on a sort criteria. In this regard, the client computing device 104 and/or the user interface component 110 may be configured to determine a sort criteria for activities associated with the one or more files hosted by the collaborative application. In one example, the sort criteria may be determined through an input received by a user of the collaborative application. The input may be received at the user interface to at least one of the activity object, the one or more files, and the collaborative application. The input may include at least one selection of the sort criteria. In some examples, the input may include more than one selection of the sort criteria. In this regard, the sort criteria may include a combination of criteria including at least missed activities, relevance, hierarchy, people, and dates.

In one example, a waterline may be used to determine missed activities relevant to a user of the one or more files hosted by the collaborative application. For example, the missed activities may include activities applied to the one or more files hosted by the collaborative application while a user of the one or more files has the one or more files closed. When the sort criteria include missed activities, the one or more files may be sorted in an activity based sort order from a highest number of missed activities to a lowest number of missed activities. For example, the file located at the top of the sorted list of files may include the file with the highest number of missed activities. In another example, the file located at the bottom of the sorted list of files may include the file with the lowest number of missed activities.

In aspects, the relevance sort criteria may include activities applied to the one or more files hosted by the collaborative application that are determined to be relevant to the user of the one or more files. In this regard, the one or more files may be sorted in an activity based sort order from a highest number of relevant activities to a lowest number of relevant activities. For example, the file located at the top of the sorted list of files may include the file with the highest number of relevant activities (e.g., activities that are relevant to the user). In another example, the file located at the bottom of the sorted list of files may include the file with the lowest number of relevant activities.

In aspects, the hierarchy sort criteria may include all the activities applied to the one or more files hosted by the collaborative application. In this regard, the one or more files may be sorted in an activity based sort order from a highest number of activities to a lowest number of activities. For example, the file located at the top of the sorted list of files may include the file with the highest number of activities. In another example, the file located at the bottom of the sorted list of files may include the file with the lowest number of activities.

In aspects, the people sort criteria may include activities by another user/team member applied to the one or more files hosted by the collaborative application. In this regard, the one or more files may be sorted in an activity based sort order based on a highest number of activities input by a specific user/team member of the one or more files to a lowest number of activities input by the specific user/team member of the one or more files. For example, the file located at the top of the sorted list of files may include the file with the highest number of activities input by user X. In another example, the file located at the bottom of the sorted list of files may include the file with the lowest number of activities input by user X.

In aspects, the dates sort criteria may include activities applied to the one or more files hosted by the collaborative application within a given period of time. For example, the one or more files may be sorted based on activities applied to the one or more files within the last month, the last week, a number of days, and/or a given day, week, and month. In this regard, the one or more files may be sorted in an activity based sort order from a highest number activities within the given time period/date to a lowest number of activities within the given time period/date. For example, the file located at the top of the sorted list of files may include the file with the highest number of activities applied to the one or more files within the last week. In another example, the file located at the bottom of the sorted list of files may include the file with the lowest number of activities applied to the one or more files within the last week.

While specific examples are described relative to the sort criteria herein it is appreciated that other sort criteria such as recently modified, recently used, a type of activity, presence in the one or more files, and the like (which will be described in more detail below) may be used to sort the one or more files hosted by the collaborative application. It is also appreciated that any combination of the sort criteria described herein may be used to sort the one or more files hosted by the collaborative application. For example, the one or more files may be sorted using a combination of the missed activities and date sort criteria such that an activity based sort order may include a highest number of missed activities within a time period to a lowest number of missed activities within a time period.

In other examples, the client computing device 104 and/or the user interface component 110 may be configured to retrieve the activities associated with the one or more files hosted by the collaborative application that meet the sort criteria from the substrate 108. In some examples, the activities may include associated activity information. For example, an activity may include an edit to a file and the associated activity information may include a number of edits to the file. In other examples, the activity itself may include a number of edits to the file. In other examples, the client computing device 104 and/or the user interface component 110 may be configured to display and/or surface activities associated with each file of the one or more sorted files. For example, each of the one or more sorted and displayed files may highlight its associated activities for viewing by a user of the one or more files. In this regard, a user may view activities associated with a file and based on the sort criteria without needing to open a file. The list of sorted files highlights its associated activities such that user may quickly and easily see the files and associated activities that matter most to the user. In the example described above relative to sort criteria, when the top file in the sorted files includes the highest number of missed activities a user can easily and quickly identify the files with the highest number of missed activities before the user opens any of the one or more sorted files.

In some examples, the highlighted associated activities may be sub-sorted for display in the user interface to the activity object of the collaborative application. For example, when a combination of sort criteria is used to sort the one or more files, a top file in the list of sorted files may include the highest number of missed activities. The top file may also be sub-sorted to include another list of sorted files that include the relevant sort criteria. In this example, the sub-sorted list of files includes an activity based sort order of files within the missed activities sort category that include relevant activities. As such, a user may see the files that include activities relevant to them and that are also activities that are missed without opening any files. The one or more sorted files may be sub-sorted and navigated using any combination of sort criteria and/or activity signals as discussed herein.

In one example, the user interface component 110 may be a touchable user interface that is capable of receiving input via contact with a screen of the client computing device 104, thereby functioning as both an input device and an output device. For example, content may be displayed, or output, on the screen of the client computing device 104 and input may be received by contacting the screen using a stylus or by direct physical contact of a user, e.g., touching the screen.

Contact may include, for instance, tapping the screen, using gestures such as swiping or pinching the screen, sketching on the screen, etc.

In another example, the user interface component 110 may be a non-touch user interface. In one case, a tablet device, for example, may be utilized as a non-touch device when it is docked at a docking station (e.g., the tablet device may include a non-touch user interface). In another case, a desktop computer may include a non-touch user interface. In this example, the non-touchable user interface may be capable of receiving input via contact with a screen of the client computing device 104, thereby functioning as both an input device and an output device. For example, content may be displayed, or output, on the screen of the client computing device 104 and input may be received by contacting the screen using a cursor, for example. In this regard, contact may include, for example, placing a cursor on the non-touchable user interface using a device such as a mouse.

In some aspects, the client computing device 104 and/or the user interface component 110 may publish activities input by one or more users of a plurality of files hosted by the collaborative application to the substrate 108. The substrate 108 may be configured to receive, store, create, generate, update, manage, and access one or more activities and/or information associated with the activity based sorting system 100. For example, the substrate 108 may receive, store, create, generate, update, and manage one or more activities associated with the one or more files hosted by the collaborative application. In another example, the substrate 108 may provide access to the one or more activities associated with the one or more files hosted by the collaborative application. In one case, the client computing device 104, the server computing device 106, and/or a collaborative application associated with the client computing device 104 and/or the server computing device 106 may access the substrate 108.

In other examples, the substrate 108 may be configured to determine an activity based sort order using at least a combination of one or more activity signals. The one or more activity signals may include at least some activities associated with the one or more files hosted by the collaborative application. As such, as or after activities are published to the substrate 108, the substrate 108 may determine an activity based sort order based on the activities.

In another example, the server computing device 106 may publish activities input by one or more users of a plurality of files hosted by a collaborative application to the substrate 108. The server computing device 106 may be configured to receive one or more activity signals including at least some of the activities from the substrate 108. In this regard, the server computing device 106 may determine an activity based sort order using at least a combination of one or more activity signals. The one or more activity signals and/or activities as discussed herein may include at least presence (e.g., users with the file currently open), recency of edits, number of edits, recency of comments, number of comments, presentation in a video meeting application, unread edits for the current user, unread comments for the current user, the files a user currently has open, the number of users that currently have some file open, files that have recent edits, the size of recent edits in each file, whether the recent edits in each file are unread by the current user, files that have recent comments, the size of recent comments in each file, whether the recent comments in each file are unread by the current user, files that have been recently created or added to the collaborative application and/or a unique user workspace, files currently being presented by users in a workspace and/or collaborative application or in a meeting, and any other similar activity signals and/or activities and any combination of the activity signals and/or activities.

The server computing device 106 may include a storage platform 130 and the data store 140. In one example, the storage platform 130 may be configured to store, manage, and access data and/or information associated with the activity based sorting system 100. For example, the storage platform 130 may store one or more files and/or one or more activities associated with a file in a data store 140. In another example, the data store 140 may include attribution information. In one example, data store 140 may be part of and/or located at the storage platform 130. In another example, data store 140 may be a separate component and/or may be located separate from the storage platform 130. It is appreciated that although one server computing device 106 is illustrated in FIG. 1, the activity based sorting system 100 may include a plurality of server computing devices 106 with a plurality of storage platforms 130 and a plurality of data stores 140. In some cases, the server computing device 106 may include a plurality of storage platforms 130 and a plurality of data stores 140. For example, the plurality of storage platforms 130 may include at least file storage providers, external activity services and document editing clients. In one example, the storage platform 130 may be a cloud storage service such as OneDrive, SharePoint, Google Drive, Dropbox, and the like.

In aspects, the storage platform 130 may communicate with the client computing device 104 and/or the substrate 108. In this regard, the storage platform 130 may retrieve and/or obtain one or more activities associated with one or more files from the substrate 108. In another case, the storage platform 130 may send one or more activities associated with one or more files to the substrate 108 for storage and/or processing.

It is appreciated that the collaborative application discussed herein, may be hosted, implemented and/or executed on the client computing device 104 and the server computing device 106. The collaborative application may perform the functions, steps, and processes as described herein relative to both the client computing device 104 and the server computing device 106. For example, the collaborative application may publish activities to the substrate 108, receive activities and/or activity signals from the substrate 108, determine an activity based sort order, sort the plurality of files, adjust the activity based sort order, re-sort the plurality of files, determine a sort criteria for one or more files, and apply the activity based sort order to sort the one or more files. It is further appreciated that all the functions, steps, and processes described relative to the client computing device 104 may be preformed by the server computing device 106.

Referring now to FIG. 2A, one view 200A in a progression of views of a collaborative application displayed on a user interface of the client computing device 104, such as a desktop computer, tablet computer or a mobile phone, for example, is shown. The exemplary collaborative application, as shown in FIG. 2A, is a Loop application. As illustrated, the exemplary view 200A of the Loop application displayed on the client computing device 104 includes an open file 204, an activity object 208, a workspace 210, one or more files 215, and a sort criteria menu 220. As illustrated in FIG. 2A, the workspace 210 is an Austin City Limits Crew workspace. The workspace 210 is unique to the user of the workspace 210. For example, another user of the Loop application illustrated in FIG. 2A may have access to the Austin City Limits Crew workspace and/or at least some of the one or more files 215. However, the one or more files 215 may be sorted based on a different sort criteria and/or activity based sort order for another user of the Loop application. In this regard, a different order of files and/or activities highlighted by the files may be displayed for each user/team member of shared files hosted by a collaborative application.

As illustrated in FIG. 2A, the workspace 210 is surfaced in a user interface to the activity object 208. The activity object 208 includes a navigation tool, as discussed herein. As such, the one or more files 215 are sorted and displayed as a list of files. In the example illustrated in FIG. 2A, the navigation tool includes a side bar of the collaborative application. The side bar illustrated includes a left navigation menu. As illustrated in FIG. 2A, the sort criteria menu 220 includes a list of options for sorting the one or more files 215. In this example, the sort criteria menu 220 includes hierarchy, recently modified, missed activity, and relevance sort options. The sort criteria menu 220 may be surfaced in response to an input by user at a sort criteria menu button 222. As shown in FIG. 2A, the missed activity sort criteria is selected. As such, the one or more files 215 may be sorted based on the missed activity sort criteria, as discussed herein.

Figure 2B:
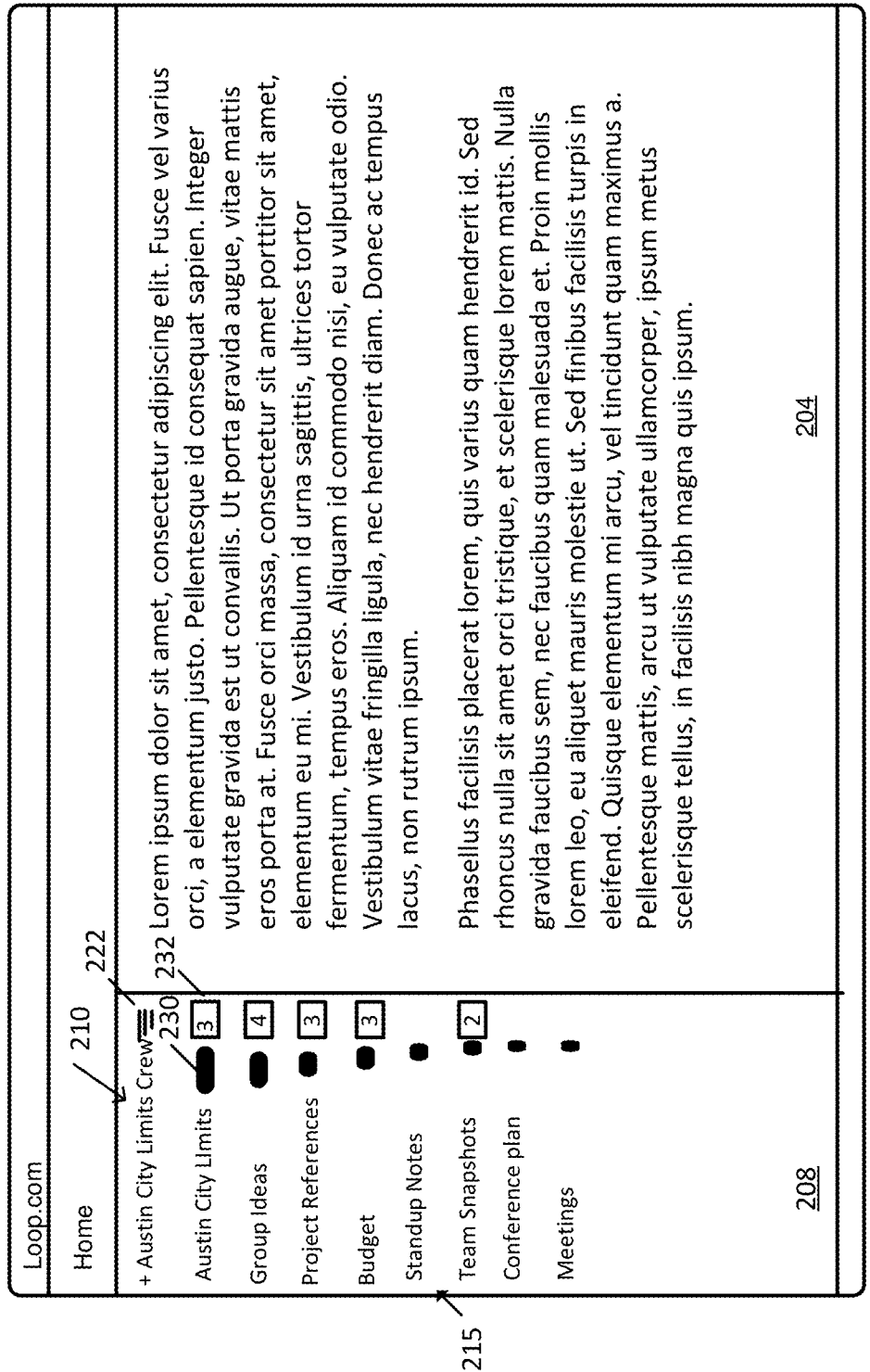
FIG. 2B illustrates another view in a progression of views of the collaborative application of FIG. 2A, according to an example aspect.

Referring now to FIG. 2B, another view 200B in a progression of views of the collaboration application displayed on a user interface of the client computing device 104, such as a desktop computer, tablet computer or a mobile phone, for example, is shown. The exemplary collaborative application, as shown in FIG. 2B, is a Loop application. As illustrated, the exemplary view 200B of the Loop application displayed on the client computing device 104 includes an open file 204, an activity object 208, a workspace 210, one or more files 215, a sort criteria menu button 222, an activity graph 230, and a relevance feature 232. As illustrated in FIG. 2B, the workspace 210 is an Austin City Limits Crew workspace. The workspace 210 is unique to the user of the workspace 210. For example, another user of the Loop application illustrated in FIG. 2B may have access to the Austin City Limits Crew workspace and/or at least some of the one or more files 215. However, the one or more files 215 may be sorted based on a different sort criteria and/or activity based sort order for another user of the Loop application. In this regard, a different order of files and/or activities highlighted by the files may be displayed for each user/team member of shared files hosted by a collaborative application.

As illustrated in FIG. 2B, the workspace 210 is surfaced in a user interface to the activity object 208. The activity object 208 includes a navigation tool, as discussed herein. As such, the one or more files 215 are sorted and displayed as a list of files. In the example illustrated in FIG. 2B, the navigation tool includes a side bar of the collaborative application. The side bar illustrated includes a left navigation menu. As discussed relative to FIG. 2A, a missed activity sort criteria may be selected in a sort criteria menu. As such, as illustrated in FIG. 2B, the one or more files 215 are sorted based on the missed activity sort criteria. The activity graph 230 highlights the missed activities for each file of the one or more files 215. As illustrated, the top file in the list of the sorted one or more files 215 is Austin City Limits. The activity graph 230 shows that the file Austin City Limits has the highest number of missed activities. As such, the file Austin City Limits is at the top of the activity based sort order. As shown in FIG. 2B, the second file in the sorted list is Group Ideas. The file Group Ideas has the second highest number of missed activities. The last file in the activity based sort list is Meetings. As shown, the file Meetings has the lowest number of missed activities. As illustrated in FIG. 2B, a user of the collaborative application and the one or more files 215 may quickly and easily see the files and their associated activities displayed in a user interface to the activity object 208 without opening any of the one or more files 215.

As shown in FIG. 2B, the relevance feature 232 is next to the activity graph 230. The relevance feature shows how many of the missed activities shown in the activity graph 230 are relevant to the user. For example, there are three activities relevant to the user in the Austin City Limits file, as illustrated. In another example, there are four activities relevant to the user in the Group Ideas file, as illustrated. In this regard, the one or more files 215 are sorted based on missed activities and sub-sorted to include the activities that are relevant to the user. The Austin City Limits file may include 50 missed activities but only three of those are relevant to the user. Thus, the user of the one or more files 215 may easily identify and see the activities she missed that are relevant to her. In another example, the relevance feature 232 may show only the most relevant activities to the user.

Figure 2C:
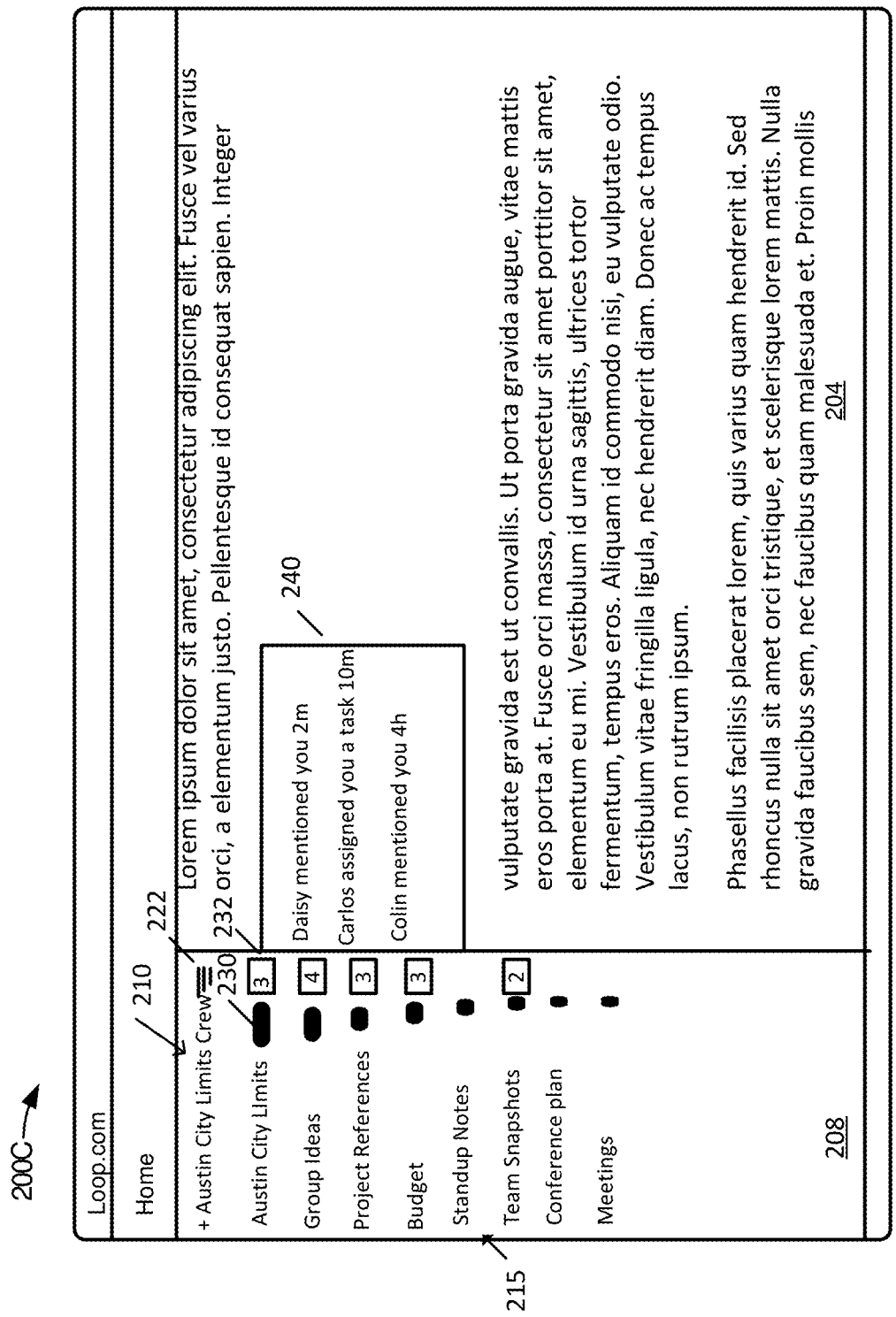
FIG. 2C illustrates another view in a progression of views of the collaborative application of FIG. 2A, according to an example aspect.

Referring now to FIG. 2C, another view 200C in a progression of views of the collaboration application displayed on a user interface of the client computing device 104, such as a desktop computer, tablet computer or a mobile phone, for example, is shown. The exemplary collaborative application, as shown in FIG. 2C, is a Loop application. As illustrated, the exemplary view 200C of the Loop application displayed on the client computing device 104 includes an open file 204, an activity object 208, a workspace 210, one or more files 215, a sort criteria menu button 222, an activity graph 230, a relevance feature 232, and an activity badge 240. As illustrated in FIG. 2C, the workspace 210 is an Austin City Limits Crew workspace. The workspace 210 is unique to the user of the workspace 210. For example, another user of the Loop application illustrated in FIG. 2C may have access to the Austin City Limits Crew workspace and/or at least some of the one or more files 215. However, the one or more files 215 may be sorted based on a different sort criteria and/or activity based sort order for another user of the Loop application. In this regard, a different order of files and/or activities highlighted by the files may be displayed for each user/team member of shared files hosted by a collaborative application.

As illustrated in FIG. 2C, the workspace 210 is surfaced in a user interface to the activity object 208. The activity object 208 includes a navigation tool, as discussed herein. As such, the one or more files 215 are sorted and displayed as a list of files. In the example illustrated in FIG. 2C, the navigation tool includes a side bar of the collaborative application. The side bar illustrated includes a left navigation menu. As discussed relative to FIG. 2A, a missed activity sort criteria may be selected in a sort criteria menu. As such, as illustrated in FIG. 2C, the one or more files 215 are sorted based on the missed activity sort criteria. The activity graph 230 highlights the missed activities for each file of the one or more files 215. As illustrated, the top file in the list of the sorted one or more files 215 is Austin City Limits. The activity graph 230 shows that the file Austin City Limits has the highest number of missed activities. As such, the file Austin City Limits is at the top of the activity based sort order. As shown in FIG. 2C, the second file in the sorted list is Group Ideas. The file Group Ideas has the second highest number of missed activities. The last file in the activity based sort list is Meetings. As shown, the file Meetings has the lowest number of missed activities. As illustrated in FIG. 2C, a user of the collaborative application and the one or more files 215 may quickly and easily see the files and their associated activities displayed in a user interface to the activity object 208 without opening any of the one or more files 215.

As shown in FIG. 2C, the relevance feature 232 is next to the activity graph 230. The relevance feature shows how many of the missed activities shown in the activity graph 230 are relevant to the user. For example, there are three activities relevant to the user in the Austin City Limits file, as illustrated. In another example, there are four activities relevant to the user in the Group Ideas file, as illustrated. In this regard, the one or more files 215 are sorted based on missed activities and sub-sorted to include the activities that are relevant to the user. The Austin City Limits file may include 70 missed activities but only three of those are relevant to the user. Thus, the user of the one or more files 215 may easily identify and see the activities she missed that are relevant to her. As shown next to the relevance feature 232 for the Austin City Limits file, an activity badge 240 may be surfaced for the user of the collaborative application. Three activities are shown in the activity badge 240. The three activities may be the most relevant activities to the user and/or may be the most recent activities to the user. For example, as illustrated, the first activity happened 2 minutes ago, the second activity happened 10 minutes ago, and the third activity happened 4 hours ago. As such, a user may easily and quickly see relevant and/or recent activities in the Austin City Limits file without having to open the file. While FIG. 2C illustrates relevant and/or recent activities, as discussed herein, any combination of sort criteria and/or activity signals may be used to sort and sub-sort the one or more files 215 for any given workspace.

Figure 2D:
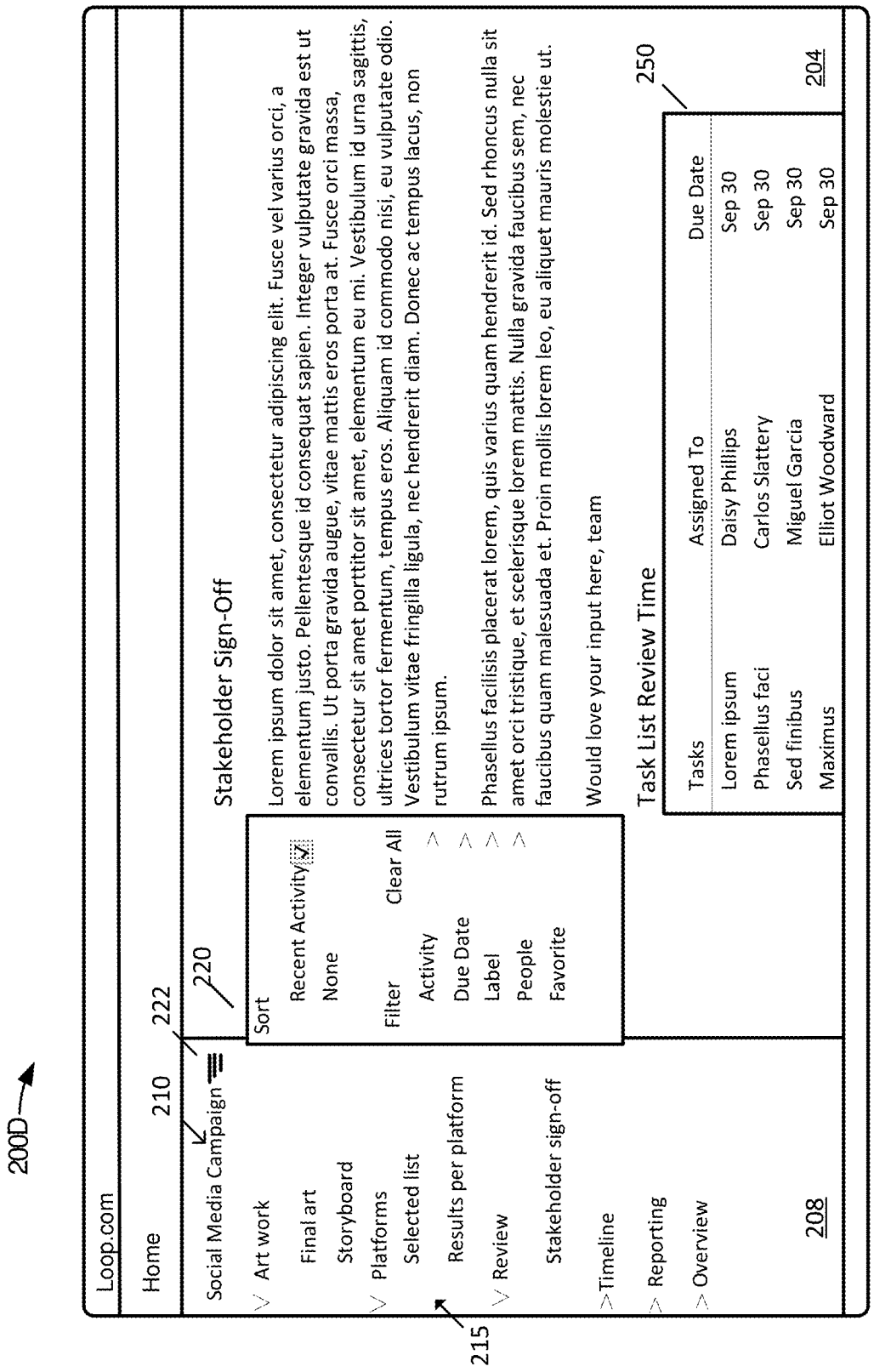
FIG. 2D illustrates another view in a progression of views of the collaborative application of FIG. 2A, according to an example aspect.

Referring now to FIG. 2D, another view 200D in a progression of views of the collaboration application displayed on a user interface of the client computing device 104, such as a desktop computer, tablet computer or a mobile phone, for example, is shown. The exemplary collaborative application, as shown in FIG. 2D, is a Loop application. As illustrated, the exemplary view 200D of the Loop application displayed on the client computing device 104 includes an open file 204, an activity object 208, a workspace 210, one or more files 215, a sort criteria menu 220, a sort criteria menu button 222, and a task list 250.

As illustrated in FIG. 2D, the workspace 210 is Social Media Campaign workspace. The workspace 210 is unique to the user of the workspace 210. For example, another user of the Loop application illustrated in FIG. 2D may have access to the Social Media Campaign workspace and/or at least some of the one or more files 215. However, the one or more files 215 may be sorted based on a different sort criteria and/or activity based sort order for another user of the Loop application. In this regard, a different order of files and/or activities highlighted by the files may be displayed for each user/team member of shared files hosted by a collaborative application.

As illustrated in FIG. 2D, the workspace 210 is surfaced in a user interface to the activity object 208. The activity object 208 includes a navigation tool, as discussed herein. As such, the one or more files 215 are sorted and displayed as a list of files. In the example illustrated in FIG. 2D, the navigation tool includes a side bar of the collaborative application. The side bar illustrated includes a left navigation menu. As illustrated in FIG. 2D, the sort criteria menu 220 includes a list of options for sorting the one or more files 215. In this example, the sort criteria menu 220 includes recent activity and none as the sort options. In addition, the sort criteria menu 220 includes filter options including activity, due date, label, people, and favorite filter options. The sort criteria menu 220 may be surfaced in response to an input by user at a sort criteria menu button 222. As shown in FIG. 2D, the recent activity sort criteria is selected. As such, the one or more files 215 may be sorted based on the recent activity sort criteria, as discussed herein. As shown, the task list 250 includes a list of tasks, who the tasks are assigned to, and a due date associated with each task. In this example, the task includes reviewing a stakeholder sign-off.

Figure 3A:
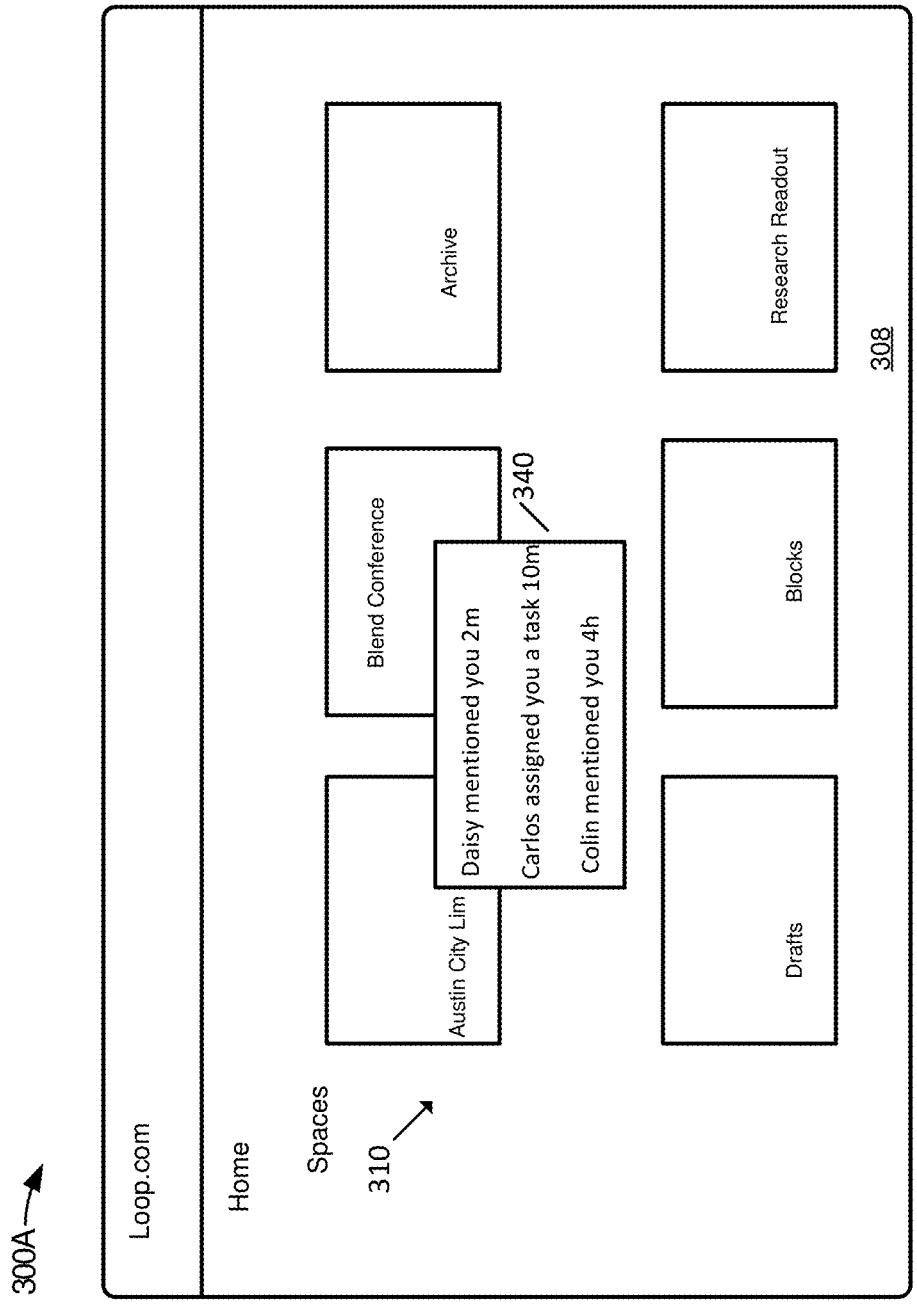
FIG. 3A illustrates one view in a progression of views of a collaborative application displayed on a user interface of a client computing device, according to an example aspect.

Referring now to FIG. 3A, one view 300A in a progression of views of a collaborative application displayed on a user interface of the client computing device 104, such as a desktop computer, tablet computer or a mobile phone, for example, is shown. The exemplary collaborative application, as shown in FIG. 3A, is a Loop application. As illustrated, the view 300A of the Loop application displayed on the client computing device 104 includes a home screen 308, an activity object 310, and an activity badge 340. As illustrated in FIG. 3A, the activity object 310 includes a workspace tool. The workspace tool includes a surface that facilitates navigating, sorting, filtering, and viewing workspaces. For example, as illustrated in FIG. 3A, the workspace tool (e.g., the activity object 310) includes six files. The files include thumbnails of workspaces. The thumbnails include an Austin City Limits Crew workspace, a Blend Conference workspace, an Archive workspace, a Drafts workspace, a Blocks workspace, and a Research Readout workspace.

As such, the one or more files (e.g., workspaces) surfaced in the user interface to the activity object 310 may be sorted based on an activity based sort order and/or sort criteria as discussed herein. Furthermore, the one or more workspaces, as illustrated, may highlight their associated activities for easy viewing by a user of the collaborative application. As shown, the Austin City Limits Crew workspace includes the activity badge 340. The activity badge 340 may be surfaced in response to a user input. In this example, the activity badge 340 includes three activities associated with the Austin City Limits Crew workspace. While FIG. 3A illustrates six files as workspaces and the activity badge 340, any combination of sort criteria and/or activity signals may be used to sort and sub-sort one or more workspaces surfaced in a user interface to the activity object 310 of the collaborative application.

Figure 3B:
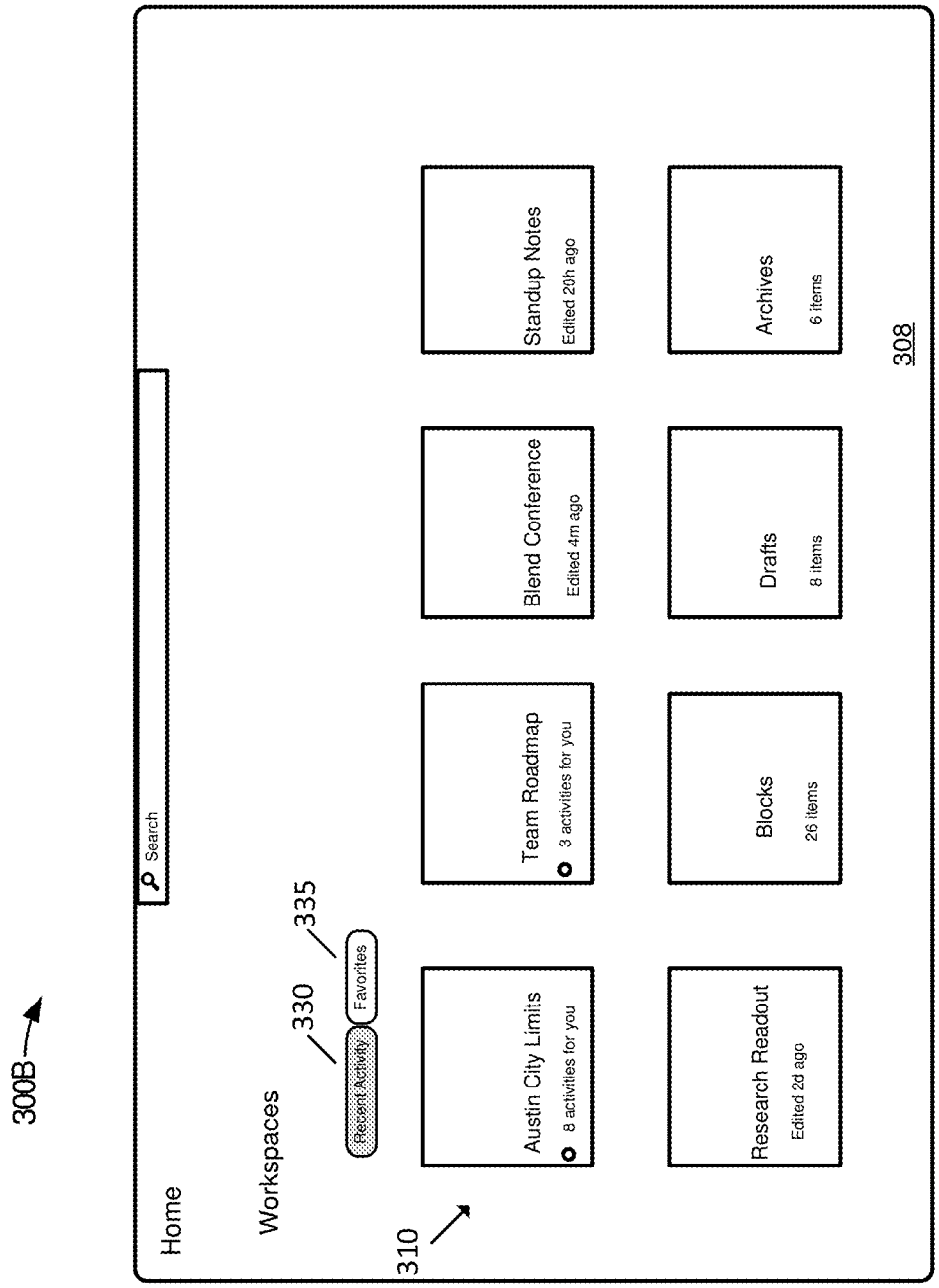
FIG. 3B illustrates another view in a progression of views of the collaborative application of FIG. 3A, according to an example aspect.

Referring now to FIG. 3B, another view 300B in a progression of views of a collaborative application displayed on a user interface of the client computing device 104, such as a desktop computer, tablet computer or a mobile phone, for example, is shown. The exemplary collaborative application, as shown in FIG. 3B, is a Loop application. As illustrated, the view 300B of the Loop application displayed on the client computing device 104 includes a home screen 308, an activity object 310, a recent activity sort button 330, and a favorites sort button 335. As illustrated in FIG. 3B, the activity object 310 includes a workspace tool. The workspace tool includes a surface that facilitates navigating, sorting, filtering, and viewing workspaces. For example, as illustrated in FIG. 3B, the workspace tool (e.g., the activity object 310) includes eight files. The files include thumbnails of workspaces. The thumbnails include an Austin City Limits workspace, a Team Roadmap workspace, a Blend Conference workspace, a Standup Notes workspace, an Archives workspace, a Drafts workspace, a Blocks workspace, and a Research Readout workspace.

As such, the one or more files (e.g., workspaces) surfaced in the user interface to the activity object 310 may be sorted based on an activity based sort order and/or sort criteria as discussed herein. Furthermore, the one or more workspaces, as illustrated, may highlight their associated activities for easy viewing by a user of the collaborative application. As shown, the Austin City Limits workspace highlights that there are 8 activities for the user. The Team Roadmap workspace highlights that there are 3 activities for the user. The Blend Conference workspace highlights that an edit happened 4 minutes ago. The Standup Notes workspace highlights that an edit happened 20 hours ago. The Archives workspace highlights 6 items. The Drafts workspace highlights 8 items. The Blocks workspace highlights 26 items. The Research Readout workspace highlights that an edit happened 2 days ago. As shown in FIG. 3B, the recent activity sort button 330 is selected. As such, the eight workspaces shown are based on recent activity. FIG. 3B further illustrates the favorites sort button 335. When the favorites sort button 335 is selected, the workspaces may be sorted based on a favorites sort criteria.

Referring now to FIG. 4, an exemplary method 400 for sorting one or more files hosted by a collaborative application, according to an example aspect is shown. Method 400 may be implemented on a computing device or a similar electronic device capable of executing instructions through at least one processor. Method 400 may begin at operation 402, where one or more activity signals associated with the one or more files hosted by the collaborative application are received from a substrate. In one example, the substrate is located outside the collaborative application. The one or more activity signals may include at least some activities associated with the one or more files hosted by the collaborative application. In some examples, as one or more updated and/or new activity signals are published to the substrate, the one or more updated and/or new activity signals may be received from the substrate. The one or more activity signals and/or updated activity signals may be received at the collaborative application hosting the one or more files. In one example, the one or more updated activity signals are received via polling the substrate for updated activity signals. The substrate may be polled at a specific time interval. In another example, the one or more updated activity signals are pushed to the collaborative application from the substrate as the one or more signals are updated.

When one or more activity signals associated with the one or more files hosted by the collaborative application are received from a substrate, flow proceeds to decision operation 404 where an activity based sort order is determined using at least a combination of the one or more activity signals. In one example, the activity based sort order is determined using at least a combination of the one or more activity signals by prioritizing the one or more activity signals using a point system. Prioritizing the one or more activity signals using the point system may include assigning more points to activity signals deemed a higher priority and less points to activity signals deemed a lower priority. The one or more files hosted by the collaborative application may be sorted by the total number of points assigned. In some examples, an updated activity based sort order may be determined using at least a combination of the one or more updated activity signals. Any combination of assigning points to activity signals and sorting using the point system may be utilized.

When an activity based sort order is determined using at least a combination of the one or more activity signals flow proceeds to operation 406 where the activity based sort order is applied to sort the one or more files hosted by the collaborative application for display in a user interface to an activity object of the collaborative application. In one example, each of the one or more sorted files highlights its associated activities for viewing by a user of the collaborative application. As one or more updated activity signals are received, an updated activity-based sort order may be applied to sort the one or more files hosted by the collaborative application for display in the user interface to the activity object of the collaborative application. In this regard, a user may continuously have easy and effortless access to updated sorted files and their associated activities without having to open files.

Figure 5:
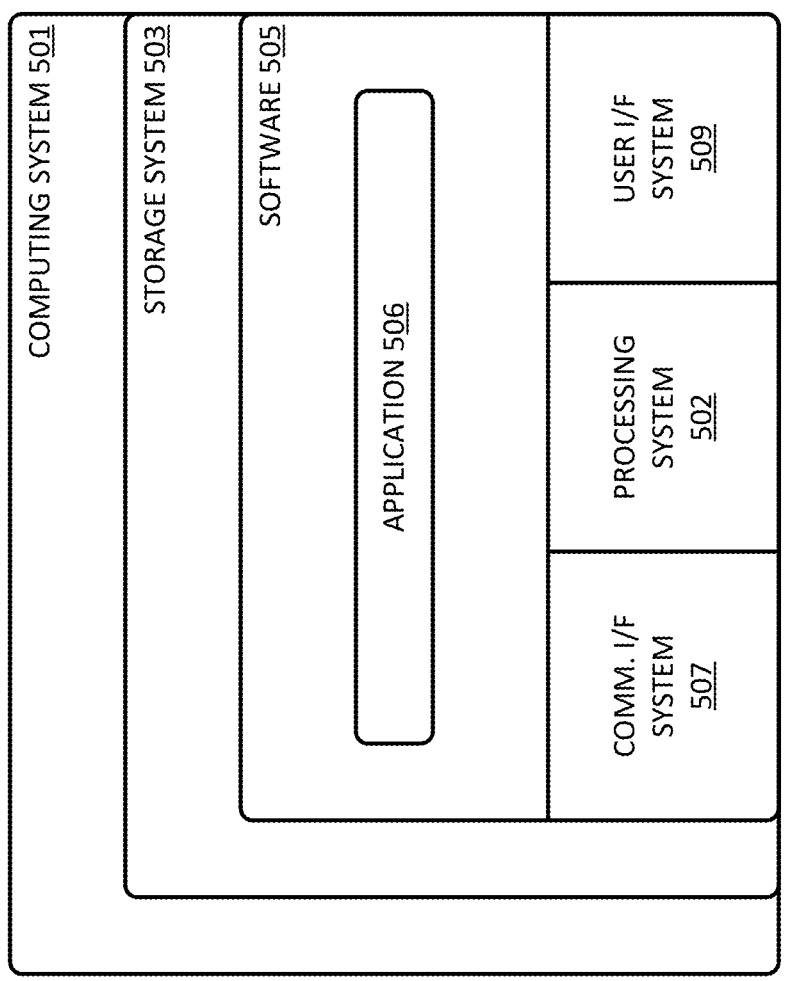
FIG. 5 illustrates a computing system suitable for implementing the enhanced activity-based sorting technology disclosed herein, including any of the environments, architectures, elements, processes, user interfaces, and operational scenarios and sequences illustrated in the Figures and discussed below in the Technical Disclosure.

FIG. 5 illustrates computing system 501 that is representative of any system or collection of systems in which the various applications, services, scenarios, and processes disclosed herein may be implemented. Examples of computing system 501 include, but are not limited to, server computers, rack servers, web servers, cloud computing platforms, and data center equipment, as well as any other type of physical or virtual server machine, container, and any variation or combination thereof. Other examples may include smart phones, laptop computers, tablet computers, desktop computers, hybrid computers, gaming machines, virtual reality devices, smart televisions, smart watches and other wearable devices, as well as any variation or combination thereof.

Computing system 501 may be implemented as a single apparatus, system, or device or may be implemented in a distributed manner as multiple apparatuses, systems, or devices. Computing system 501 includes, but is not limited to, processing system 502, storage system 503, software 505, communication interface system 507, and user interface system 509. Processing system 502 is operatively coupled with storage system 503, communication interface system 507, and user interface system 509.

Processing system 502 loads and executes software 505 from storage system 503. Software 505 includes application 506, which is representative of the applications discussed with respect to the preceding FIGS. 1-4, including collaboration applications described herein. When executed by processing system 502 to enhance activity based sorting, software 505 directs processing system 502 to operate as described herein for at least the various processes, operational scenarios, and sequences discussed in the foregoing implementations. Computing system 501 may optionally include additional devices, features, or functionality not discussed for purposes of brevity.

Referring still to FIG. 5, processing system 502 may comprise a micro-processor and other circuitry that retrieves and executes software 505 from storage system 503. Processing system 502 may be implemented within a single processing device, but may also be distributed across multiple processing devices or sub-systems that cooperate in executing program instructions. Examples of processing system 502 include general purpose central processing units, application specific processors, and logic devices, as well as any other type of processing device, combinations, or variations thereof.

Storage system 503 may comprise any computer readable storage media readable by processing system 502 and capable of storing software 505. Storage system 503 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 503 may also include computer readable communication media over which at least some of software 505 may be communicated internally or externally. Storage system 503 may be implemented as a single storage device, but may also be implemented across multiple storage devices or sub-systems co-located or distributed relative to each other. Storage system 503 may comprise additional elements, such as a controller, capable of communicating with processing system 502 or possibly other systems.

Software 505 may be implemented in program instructions and among other functions may, when executed by processing system 502, direct processing system 502 to operate as described with respect to the various operational scenarios, sequences, and processes illustrated herein. For example, software 505 may include program instructions for implementing enhanced activity based sorting systems.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 505 may include additional processes, programs, or components, such as operating system software, virtual machine software, or other application software, in addition to or that include application 506. Software 505 may also comprise firmware or some other form of machine-readable processing instructions executable by processing system 502.

In general, software 505 may, when loaded into processing system 502 and executed, transform a suitable apparatus, system, or device (of which computing system 501 is representative) overall from a general-purpose computing system into a special-purpose computing system customized to facilitate enhanced activity based sorting. Indeed, encoding software 505 on storage system 503 may transform the physical structure of storage system 503. The specific transformation of the physical structure may depend on various factors in different implementations of this description. Examples of such factors may include, but are not limited to, the technology used to implement the storage media of storage system 503 and whether the computer-storage media are characterized as primary or secondary storage, as well as other factors.

For example, if the computer readable storage media are implemented as semiconductor-based memory, software 505 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 507 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 509 is optional and may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 509. In some cases, the input and output devices may be combined in a single device, such as a display capable of displaying images and receiving touch gestures. The aforementioned user input and output devices are well known in the art and need not be discussed at length here.

User interface system 509 may also include associated user interface software executable by processing system 502 in support of the various user input and output devices discussed above. Separately or in conjunction with each other and other hardware and software elements, the user interface software and user interface devices may support a graphical user interface, a natural user interface, or any other type of user interface.

Communication between computing system 501 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transfer control protocol (TCP), and the user datagram protocol (UDP), as well as any other suitable communication protocol, variation, or combination thereof.

In any of the aforementioned examples in which data, content, or any other type of information is exchanged, the exchange of information may occur in accordance with any of a variety of protocols, including FTP (file transfer protocol), HTTP (hypertext transfer protocol), REST (representational state transfer), WebSocket, DOM (Document Object Model), HTML (hypertext markup language), CSS (cascading style sheets), HTML5, XML (extensible markup language), JavaScript, JSON (JavaScript Object Notation), and AJAX (Asynchronous JavaScript and XML), as well as any other suitable protocol, variation, or combination thereof.

Among other examples, the present disclosure presents systems comprising: one or more computer readable storage media; and program instructions stored on the one or more computer readable storage media that, when executed by at least one processor, cause the at least one processor to at least: publish activities input by one or more users of a plurality of files hosted by a collaborative application to a substrate; receive one or more activity signals including at least some of the activities from the substrate; sort the plurality of files hosted by the collaborative application using an activity-based sort order for display in a user interface to an activity object of the collaborative application; receive one or more updated activity signals including updated activities; adjust the activity-based sort order based on the one or more updated activity signals; and re-sort the plurality of files hosted by the collaborative application using the adjusted activity-based sort order for display in the user interface to the activity object of the collaborative application. In further examples, to receive one or more updated activity signals the program instructions, when executed by the at least one processor, further cause the at least one processor to at least poll the substrate for updated activity signals. In further examples, each of the plurality of files highlights its associated activities for viewing by a user of the collaborative application. In further examples, to adjust the activity-based sort order based on the one or more updated activity signals, the program instructions, when executed by the at least one processor, further cause the at least one processor to prioritize the plurality of files from top to bottom based on relevancy for a user of the collaborative application. In further examples, when the plurality of files is re-sorted each of the plurality of files is updated to reflect its associated updated activities for viewing by a user of the collaborative application.

Further aspects disclosed herein provide an exemplary method for sorting one or more files hosted by a collaborative application, the method comprising: receiving one or more activity signals associated with the one or more files hosted by the collaborative application from a substrate; determining an activity-based sort order using at least a combination of the one or more activity signals; and applying the activity-based sort order to sort the one or more files hosted by the collaborative application for display in a user interface to an activity object of the collaborative application. In further examples, the substrate is located outside the collaborative application. In further examples, determining the activity-based sort order using at least a combination of the one or more activity signals comprises prioritizing the one or more activity signals using a point system. In further examples, prioritizing the one or more activity signals using the point system comprises: assigning more points to activity signals deemed a higher priority and less points to activity signals deemed a lower priority; and sorting the one or more files hosted by the collaborative application by a total number of points assigned. In further examples, the one or more activity signals include at least some activities associated with the one or more files hosted by the collaborative application. In further examples, each of the one or more sorted files highlights its associated activities for viewing by a user of the collaborative application. In further examples, the method further comprises receiving one or more updated activity signals associated with the one or more files from the substrate; determining an updated activity-based sort order using at least a combination of the one or more activity signals; and applying the updated activity-based sort order to sort the one or more files hosted by the collaborative application for display in the user interface to the activity object of the collaborative application.

Additional aspects disclosed herein provide exemplary computing apparatus comprising: one or more computer readable storage media; and one or more processors operatively coupled with the one or more computer readable storage media; and a collaborative application comprising program instructions stored on the one or more computer readable storage media that, when executed by the one or more processors, direct the computing apparatus to at least: determine a sort criteria for activities associated with one or more files hosted by the collaborative application; retrieve the activities associated with the one or more files hosted by the collaborative application that meet the sort criteria from a substrate, where the activities include associated activity information; and sort the one or more files hosted by the collaborative application based on the sort criteria for display in a user interface to an activity object of the collaborative application, where each of the one or more sorted files highlights its associated activities. In further examples, the program instructions further direct the computing apparatus to receive an input by a user of the collaborative application comprising at least one selection of the sort criteria. In further examples, the activity object includes at least one of a navigation tool, a graph tool, and a workspace tool. In further examples, the sort criteria includes missed activities. In further examples, the missed activities include activities applied to the one or more files hosted by the collaborative application while a user of the one or more files has the one or more files closed. In further examples, when the sort criteria includes missed activities, the program instructions further direct the computing apparatus to sort the one or more files in a sort order from a highest number of missed activities to a lowest number of missed activities. In further examples, the sort criteria includes a combination of criteria including missed activities, relevance, hierarchy, people, and dates. In further examples, the program instructions further direct the computing apparatus to sub-sort the highlighted associated activities for display in the user interface to the activity object of the collaborative application.

Techniques for sorting one or more files hosted by a collaborative application are described. Although aspects are described in language specific to structural features and/or methodological acts, it is to be understood that the aspects defined in the appended claims are not necessarily limited to the specific features or acts described above. Rather, the specific features and acts are disclosed as example forms of implementing the claimed aspects.

A number of methods may be implemented to perform the techniques discussed herein. Aspects of the methods may be implemented in hardware, firmware, or software, or a combination thereof. The methods are shown as a set of blocks that specify operations performed by one or more devices and are not necessarily limited to the orders shown for performing the operations by the respective blocks. Further, an operation shown with respect to a particular method may be combined and/or interchanged with an operation of a different method in accordance with one or more implementations. Aspects of the methods may be implemented via interaction between various entities discussed above with reference to the touchable user interface.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an aspect with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

Additionally, while the aspects may be described in the general context of activity based sorting systems that execute in conjunction with an application program that runs on an operating system on a computing device, those skilled in the art will recognize that aspects may also be implemented in combination with other program modules. In further aspects, the aspects disclosed herein may be implemented in hardware.

Generally, program modules include routines, programs, components, data structures, and other types of structures that perform particular tasks or implement particular abstract data types. Moreover, those skilled in the art will appreciate that aspects may be practiced with other computer system configurations, including hand-held devices, multiprocessor systems, microprocessor-based or programmable consumer electronics, minicomputers, mainframe computers, and comparable computing devices. Aspects may also be practiced in distributed computing environments where tasks are performed by remote processing devices that are linked through a communications network. In a distributed computing environment, program modules may be located in both local and remote memory storage devices.

Aspects may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or compact servers, an application executed on a single computing device, and comparable systems.

What is claimed is:

1. A computing apparatus comprising:
   one or more computer readable storage media; and
   one or more processors operatively coupled with the one or more computer readable storage media; and
   a collaborative application comprising program instructions stored on the one or more computer readable storage media that, when executed by the one or more processors, direct the computing apparatus to at least:
   determine a sort criteria for activities associated with files hosted by the collaborative application;
   retrieve the activities associated with the files hosted by the collaborative application that meet the sort criteria from a substrate, where the activities include associated activity information;
   sort the files hosted by the collaborative application based on the sort criteria for display in a user interface to an activity object of the collaborative application, wherein each of the sorted files highlights its associated activities; and
   re-sort the files based on the sort criteria and one or more updated activity signals, wherein each of the re-sorted files is updated to reflect its associated updated activities.

2. The computing apparatus of claim 1, wherein the program instructions further direct the computing apparatus to receive an input by a user of the collaborative application comprising at least one selection of the sort criteria.

3. The computing apparatus of claim 1, wherein the activity object includes at least one of a navigation tool, a graph tool, and a workspace tool.

4. The computing apparatus of claim 1, wherein the sort criteria includes missed activities.

5. The computing apparatus of claim 4, wherein the missed activities include activities applied to the files hosted by the collaborative application while a user of the files has the files closed.

6. The computing apparatus of claim 4, wherein when the sort criteria includes missed activities, the program instructions further direct the computing apparatus to sort the files in a sort order from a highest number of missed activities to a lowest number of missed activities.

7. The computing apparatus of claim 1, wherein the sort criteria includes a combination of criteria including missed activities, relevance, hierarchy, people, and dates.

8. The computing apparatus of claim 7, wherein the program instructions further direct the computing apparatus to sub-sort the highlighted associated activities for display in the user interface to the activity object of the collaborative application.

9. One or more non-transitory computer-readable storage media having program instructions stored thereon that, when executed by one or more processors of a computing device, direct the computing device to at least:
   determine a sort criteria for activities associated with files hosted by a collaborative application;
   retrieve the activities associated with the files hosted by the collaborative application that meet the sort criteria from a substrate, where the activities include associated activity information;
   sort the files hosted by the collaborative application based on the sort criteria for display in a user interface to an activity object of the collaborative application, wherein each of the sorted files highlights its associated activities; and
   re-sort the files based on the sort criteria and one or more updated activity signals, wherein each of the re-sorted files is updated to reflect its associated updated activities.

10. The one or more non-transitory computer-readable storage media of claim 9, wherein the program instructions further direct the computing device to receive an input by a user of the collaborative application comprising at least one selection of the sort criteria.

11. The one or more non-transitory computer-readable storage media of claim 9, wherein the activity object includes at least one of a navigation tool, a graph tool, and a workspace tool.

12. The one or more non-transitory computer-readable storage media of claim 9, wherein the sort criteria includes missed activities.

13. The one or more non-transitory computer-readable storage media of claim 12, wherein when the sort criteria includes missed activities, the program instructions further direct the computing device to sort the files in a sort order from a highest number of missed activities to a lowest number of missed activities.

14. A method of operating a computing device, the method comprising:
on the computing device:
determining a sort criteria for activities associated with files hosted by a collaborative application;
retrieving the activities associated with the files hosted by the collaborative application that meet the sort criteria from a substrate, where the activities include associated activity information;
sorting the files hosted by the collaborative application based on the sort criteria for display in a user interface to an activity object of the collaborative application, wherein each of the sorted files highlights its associated activities; and
re-sorting the files based on the sort criteria and one or more updated activity signals, wherein each of the re-sorted files is updated to reflect its associated updated activities.

15. The method of claim 14, further comprising receiving an input by a user of the collaborative application comprising at least one selection of the sort criteria.

16. The method of claim 14, wherein the activity object includes at least one of a navigation tool, a graph tool, and a workspace tool.

17. The method of claim 14, wherein the sort criteria includes missed activities.

18. The method of claim 17, wherein the missed activities include activities applied to the files hosted by the collaborative application while a user of the files has the files closed.

19. The method of claim 17, further comprising, when the sort criteria includes missed activities, sorting the files in a sort order from a highest number of missed activities to a lowest number of missed activities.

20. The method of claim 14, wherein the sort criteria includes a combination of criteria including missed activities, relevance, hierarchy, people, and dates.

* * * * *